(12) United States Patent
Ibrahim et al.

(10) Patent No.: US 7,611,266 B2
(45) Date of Patent: Nov. 3, 2009

(54) SINGLE PATH ROAD GEOMETRY PREDICTIVE ADAPTIVE FRONT LIGHTING ALGORITHM USING VEHICLE POSITIONING AND MAP DATA

(75) Inventors: Faroog Abdel-kareem Ibrahim, Dearborn Heights, MI (US); Markus Klein, Bad Honnef (DE); Christoph Schmidt, Bergisch Gladbach (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 121 days.

(21) Appl. No.: 11/691,966

(22) Filed: Mar. 27, 2007

(65) Prior Publication Data

US 2008/0239734 A1    Oct. 2, 2008

(51) Int. Cl.
*B60Q 1/00* (2006.01)
*F21V 21/28* (2006.01)

(52) U.S. Cl. .......................... 362/464; 362/37; 362/40; 362/465; 362/466; 362/507; 180/168

(58) Field of Classification Search ............... 362/37, 362/276, 449, 40, 464, 465, 466, 507; 180/168
See application file for complete search history.

(56) References Cited

U.S. PATENT DOCUMENTS

| | | | |
|---|---|---|---|
| 4,583,152 A | 4/1986 | Kawai et al. | |
| 5,537,003 A | 7/1996 | Bechtel et al. | |
| 5,562,336 A * | 10/1996 | Gotou | 362/466 |
| 5,660,454 A * | 8/1997 | Mori et al. | 362/466 |
| 6,161,071 A | 12/2000 | Shuman et al. | |
| 6,752,508 B2 * | 6/2004 | Kobayashi | 362/37 |
| 6,984,060 B2 | 1/2006 | Baba et al. | |
| 6,993,255 B2 | 1/2006 | Braun et al. | |
| 7,104,664 B2 * | 9/2006 | Sugimoto et al. | 362/37 |

* cited by examiner

*Primary Examiner*—Jacob Y Choi
(74) *Attorney, Agent, or Firm*—Brinks Hofer Gilson & Lione

(57) ABSTRACT

A system for predictive front lighting of a vehicle. The system includes a first and second headlamps, a first and second swivel mechanisms and a controller. The first and second headlamps project a beam pattern for illumination of the vehicle path. The controller receives vehicle position data, for example from a GPS system, and accesses a map database to identify a map location of the vehicle. The controller further analyzes the map to determine a most likely path of the vehicle based on the map location and other vehicle heading parameters. The controller then calculates the desired swivel angle of the first and second headlamps based on the most likely path of the vehicle, and the first and second swivel mechanisms manipulate the first and second headlamps to accordingly change the swivel angle of the headlamps.

17 Claims, 6 Drawing Sheets

SINGLE PATH ROAD GEOMETRY PREDICTIVE ADAPTIVE FRONT LIGHTING ALGORITHM USING VEHICLE POSITIONING AND MAP DATA

BACKGROUND

1. Field of the Invention

The present invention generally relates to a system for adaptive front lighting in a motor vehicle.

2. Description of Related Art

Conventional Adaptive Front Lighting (AFS) uses the steering angle and the vehicle speed as the core data to estimate the desired swivel angle of the headlamps. Accordingly, the system only reacts to the sensed instantaneous path of the vehicle. In some instances, however, the instantaneous vehicle path is not entirely indicative of road path in front of the vehicle. This may often be true just before the vehicle enters or exits a curve, during a changing radius of curvature curve, or an S-curve scenario. Often it may be advantageous for the headlamps' performance to illuminate the upcoming road (leading the way) when it varies from the current vehicle path. Therefore, lighting provided by conventional AFS systems would not be optimal in these scenarios.

In view of the above, it is apparent that there exists a need for an improved adaptive front lighting system for motor vehicles.

SUMMARY

In satisfying the above need, as well as overcoming the enumerated drawbacks and other limitations of the related art, the present invention provides an improved adaptive front lighting system for a vehicle. According to the present invention, the system predicts upcoming vehicle path data to optimally manipulate the beam from the headlamps.

The system includes first and second headlamps, first and second swivel mechanisms, and a controller. The first and second headlamps cooperate to project a beam pattern for illumination of the vehicle path. The first and second swivel mechanisms manipulate the first and second headlamps to change a swivel angle of the headlamps.

In operation, the controller receives vehicle position data, for example from a GPS system. The controller may access a map database and use the vehicle position data to identify a map location of the vehicle. The controller analyzes the map to determine a most likely path, based on the map location and other vehicle heading parameters. The controller then calculates the desired swivel angle of the first and second headlamps based on the calculated most likely path geometry data and causes the headlamps to be appropriately moved so that the most likely vehicle path is illuminated.

The beam pattern includes a kink point, as further defined herein, and the controller may calculate the desired swivel angles such that the kink point position will be determined relative to the most likely path. As such, the controller may be configured to calculate a nominal swivel angle such that the kink point will be a predefined distance from the center of the vehicle's lane of operation.

In addition, the controller may calculate a maximum swivel angle that does not create glare for oncoming traffic. As such, the controller may determine the desired swivel angle based on the maximum swivel angle and the nominal swivel angle.

Further objects, features and advantages of this invention will become readily apparent to persons skilled in the art after a review of the following description, with reference to the drawings and claims that are appended to and form a part of this specification.

DETAILED DESCRIPTION

Figure 1:
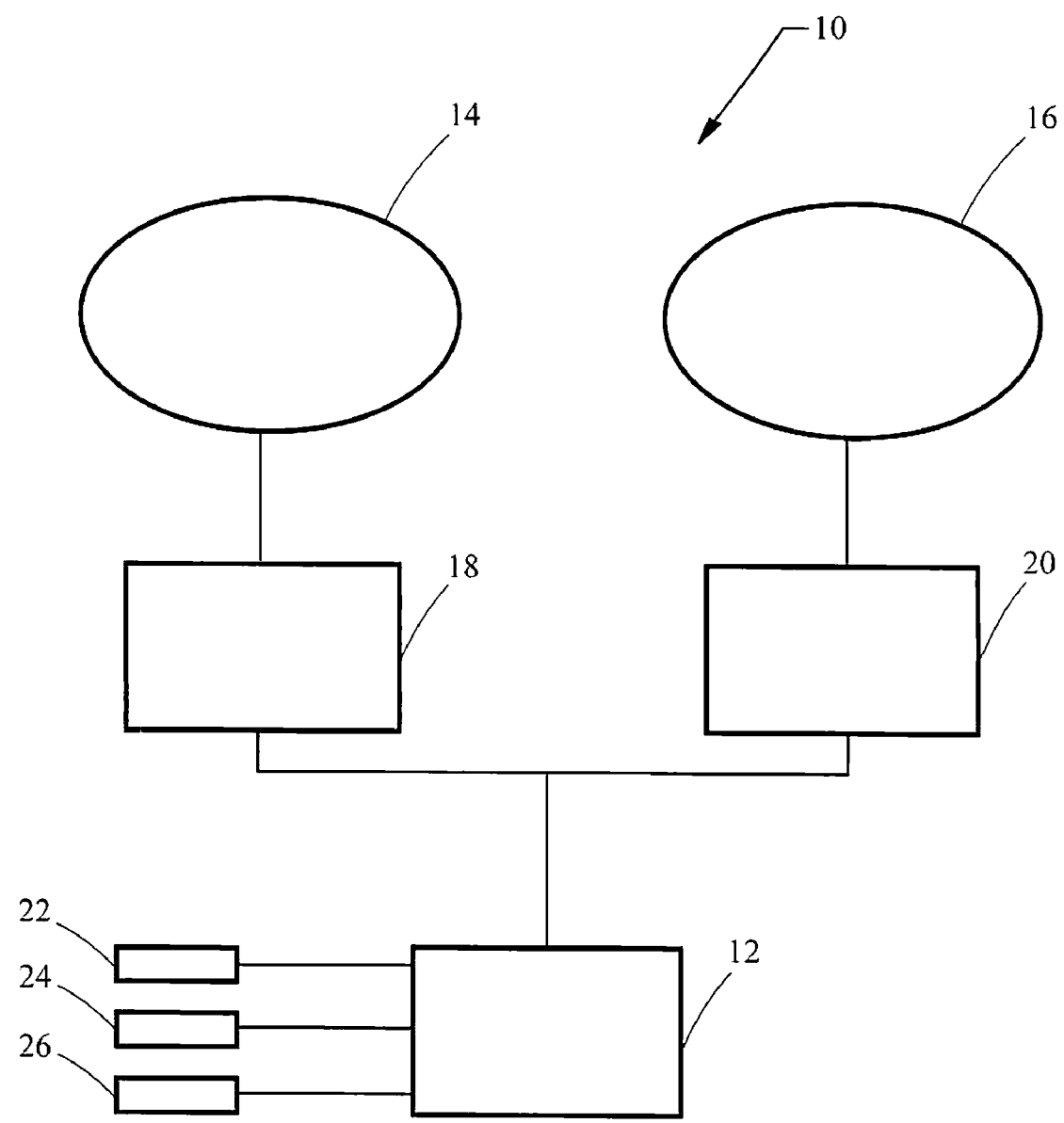
FIG. 1 is a schematic view of an adaptive front lighting system for a vehicle and embodying the principles of the present invention.

Referring now to FIG. 1, a system embodying the principles of the present invention is illustrated therein and generally designated at 10. The system 10 includes a controller 12, a first headlamp 14, a second headlamp 16, a first swivel mechanism 18, and a second swivel mechanism 20. A controller 12 receives input from one or more of a GPS system 22, a yaw rate sensor 24, and a vehicle speed sensor 26. The controller 12 is configured to predict a most likely vehicle path based on a stored map database and the various inputs from the GPS system 22, the yaw rate sensor 24, and/or the vehicle speed sensor 26. Based on the predicted path, the controller 12 manipulates the first and second swivel mechanisms 18, 20 to respectively direct the first and second headlamps 14, 16 for illumination of the predicted vehicle path. The first and second swivel mechanisms 18, 20 may take many forms, including, for example, a linear drive that is attached to one side of the headlamp causing it to swivel about a pivot point or a drive for direct rotational control. Regardless of the implementation, the swivel mechanisms 18, 20 manipulate a projected position of the light beam from the headlamps 14, 16 in front of the vehicle. This manipulation may be in plane or in more than one plane.

The controller 12 predicts the upcoming vehicle path, assuming a single path, to optimally swivel the headlamps' beam. In many scenarios, the current vehicle heading or steering parameters may not accurately indicate the future vehicle path and/or optimal illumination pattern for the driver.

Figure 2A:
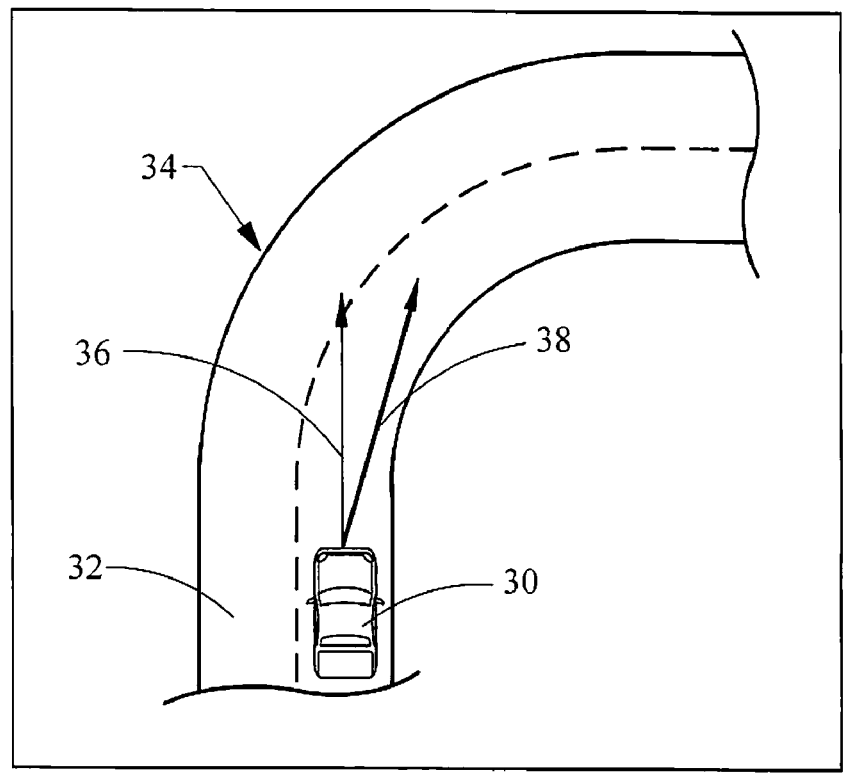
FIG. 2A is an overhead view of a curved entry scenario.

In the scenarios shown in FIGS. 2A-D, a conventional AFS system, as previously described, fails to swivel the headlamps to the optimal position for the future vehicle path. In FIG. 2A, a curve entry scenario is shown. In this scenario, the vehicle 30 is driven on a straight road 32 just prior to a curve 34. The vehicle yaw, as well as, the steering wheel angle would seem to indicate that the vehicle path would be straight in front of the vehicle 30, as denoted by arrow 36. Accordingly, a conventional AFS system would illuminate the area directly in front the vehicle 30. This may cause the headlamps to glare at oncoming traffic. However, it is desirable for the headlamps to start to swivel ahead of the curve to improve the visibility of the curve ahead and to avoid glare for the oncoming traffic, as denoted by arrow 38.

Figure 2B:
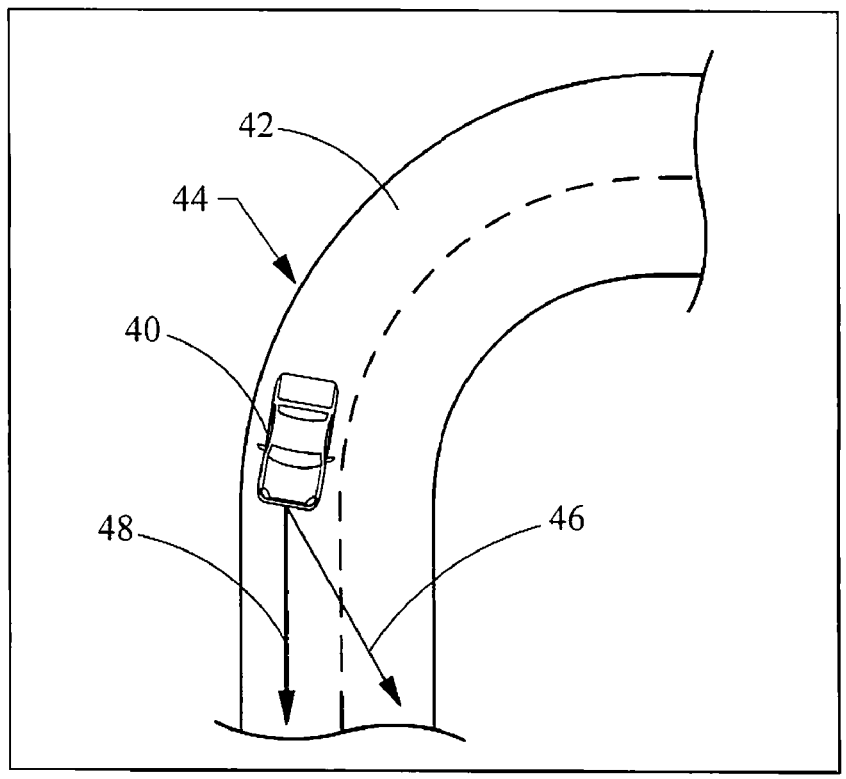
FIG. 2B is an overhead view of a curved exit scenario.

In FIG. 2B, a curve exit scenario is shown. The vehicle 40 is driven on a curved road 42 just prior to exiting a curve 44 in this scenario. The vehicle yaw, as well as the steering wheel angle, indicates that the vehicle 40 is currently turning at a given turn angle. Accordingly, a conventional AFS system would illuminate an area in front of the vehicle 40 but offset by the turn angle, as denoted by arrow 46. It is desirable in this scenario that the headlamps start to swivel back to the straight position before the end of the curve to improve the visibility of the straight road segment ahead and to avoid glare for the oncoming traffic, as denoted by arrow 48.

Figure 2C:
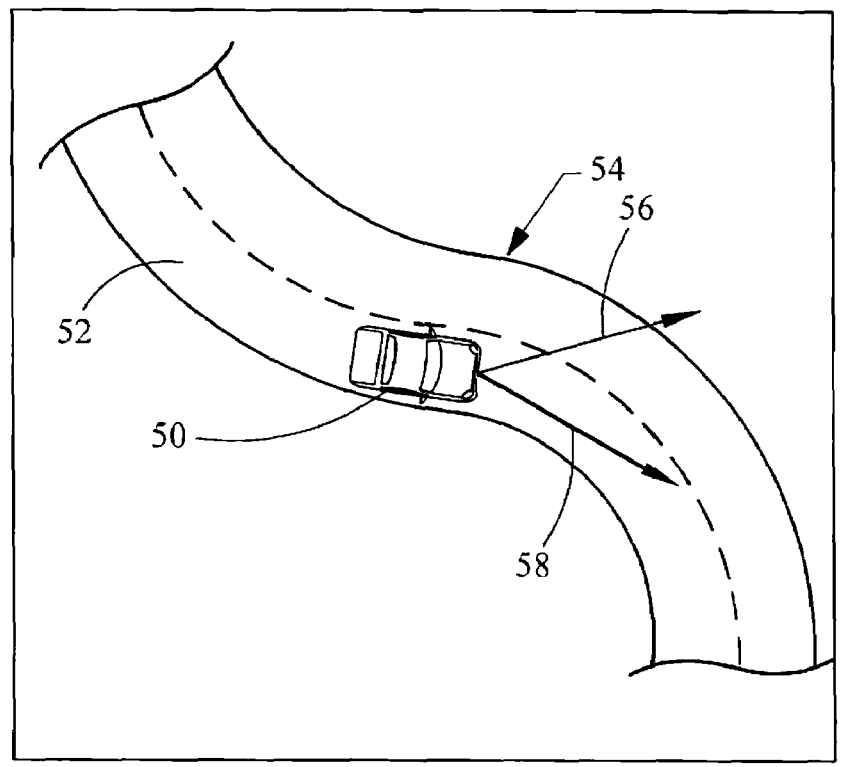
FIG. 2C is an overhead view of the S-curve scenario.

In FIG. 2C, an S-curve scenario is shown. Here, the vehicle 50 is driven on a road 52 through an S-curve 54. The vehicle yaw, as well as, the steering wheel angle indicate that the vehicle 50 is currently turning at a given turn angle. Further, for the example shown, the yaw rate indicates the vehicle 50 is turning to the left. Accordingly, a conventional AFS system would illuminate an area in front of the vehicle but offset to the left by the turn angle, as denoted by arrow 56. Not only would the headlamps glare the oncoming traffic, but the headlamps would provide illumination that is directed to the left of the vehicle 50 when the future vehicle path is to the right of the vehicle 50. Therefore, it is desirable that the headlamps start to swivel before the saddle point in the direction of the upcoming curve to improve the visibility of the curve ahead and to avoid glare for the oncoming traffic, as denoted by arrows 58.

Figure 2D:
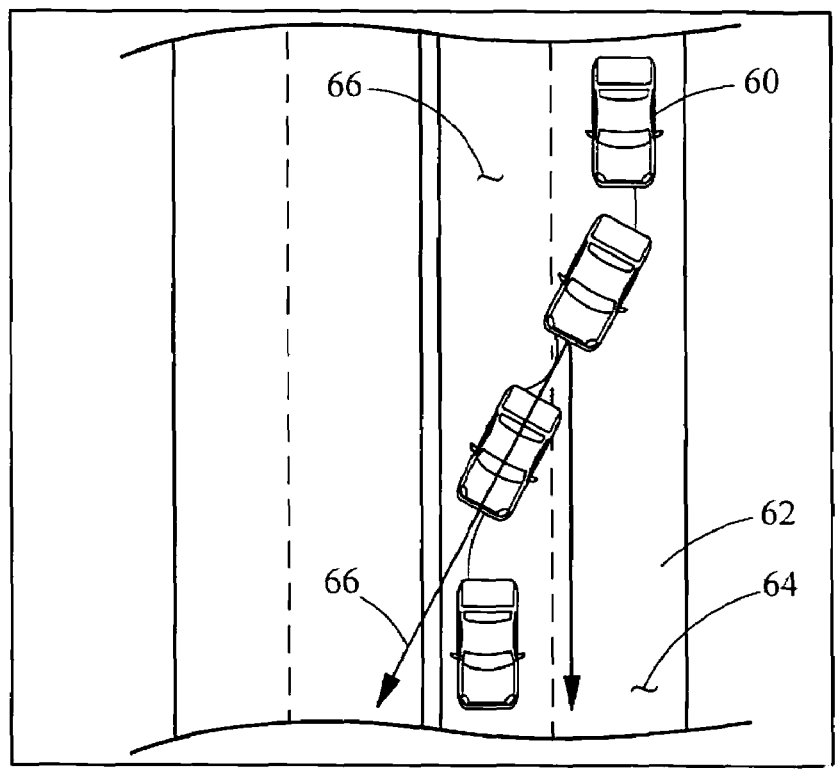
FIG. 2D is an overhead view of a lane change scenario.

Finally, a lane change scenario is shown in FIG. 2D. Ideally, the system 10 will keep the headlamps' beam parallel to the road, as denoted by arrow 68 while the vehicle 60 is driven along a straight segment of road 62 and changes from a first lane 64 to a second lane 66. The vehicle yaw, as well as the steering wheel angle, indicate that the vehicle 60 is currently turning at a given turn angle, as denoted by arrow 66. The general path of the vehicle 60, however, is straight ahead.

The conventional AFS system cannot achieve the above desired performances because it uses the instantaneous (at the vehicle current position) steering angle and vehicle speed measurements to manipulate the headlamps 14, 16. Even if the instantaneous measurement is filtered and dead zones are applied to overcome any jittering in the steering angle measurement resulting from the lane adjustments by the driver, the illumination will still not be optimal. Filtering and dead zoning operations delay performance of a conventional AFS in the above road scenarios. Moreover, conventional AFS performance is negatively affected by many typical driving behaviors, for example lane changes. It is desirable that the headlamps do not remain in their straight position in this road scenario.

Figure 3:
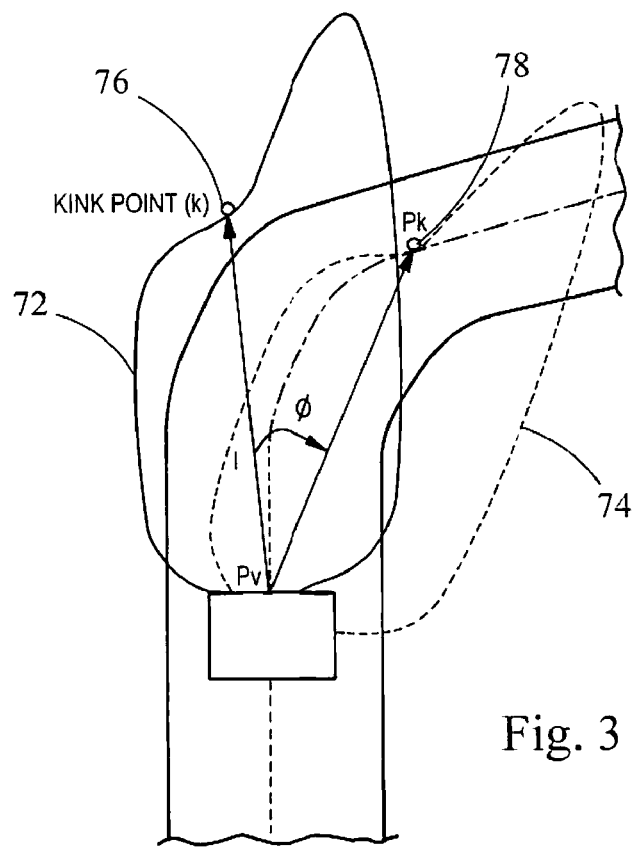
FIG. 3 is an overhead view illustrating the effect of the swivel angle on the beam pattern.

FIG. 3 shows, in the curve entry scenario, a first projected beam pattern 72 for a conventional AFS system (in this scenario) and a second beam pattern 74 for the system 10 of the present invention. The first beam pattern 72 has a kink point 76 formed by the overlapping patterns from the first and second headlamp 14,16. A kink point is an inflection point in the low beam and may have a luminance value of around 1 Lux. Further, the kink point may be the location in the low beam where the longitudinal axis of the vehicle intersects with the cut-off line between the high and the low beams. Ideally, the kink point is located in the center of the desired illumination area. Similarly, the second beam pattern 74 has kink point 78. The system 10 swivels the headlamps' beam by an angle φ such that the beam kink point 74 is in the middle of the host vehicle lane, the lane occupied by the vehicle equipped with the present system 10. The system 10 utilizes an algorithm that calculates the upcoming path data, such as curvature data, along the predicted vehicle path. The system 10 is configured to achieve the optimal visibility for travel in the host vehicle lane, under the constraint that the glare is minimized, to the extent possible, for oncoming traffic.

Unfortunately, turns in roads do not have a constant curvature. As a result, swiveling a constant shape headlamp beam pattern to optimally cover the host vehicle lane can be challenging without glaring the oncoming traffic or increasing the visibility on one part of the lane at the expense of the other part. Further, the geometry of some roads may pose particular challenges. For example in an S-curve road geometry, the sign (direction) of the curvature changes quickly over a relatively short distance. Similar challenges arise when the vehicle changes lanes.

Figure 4:
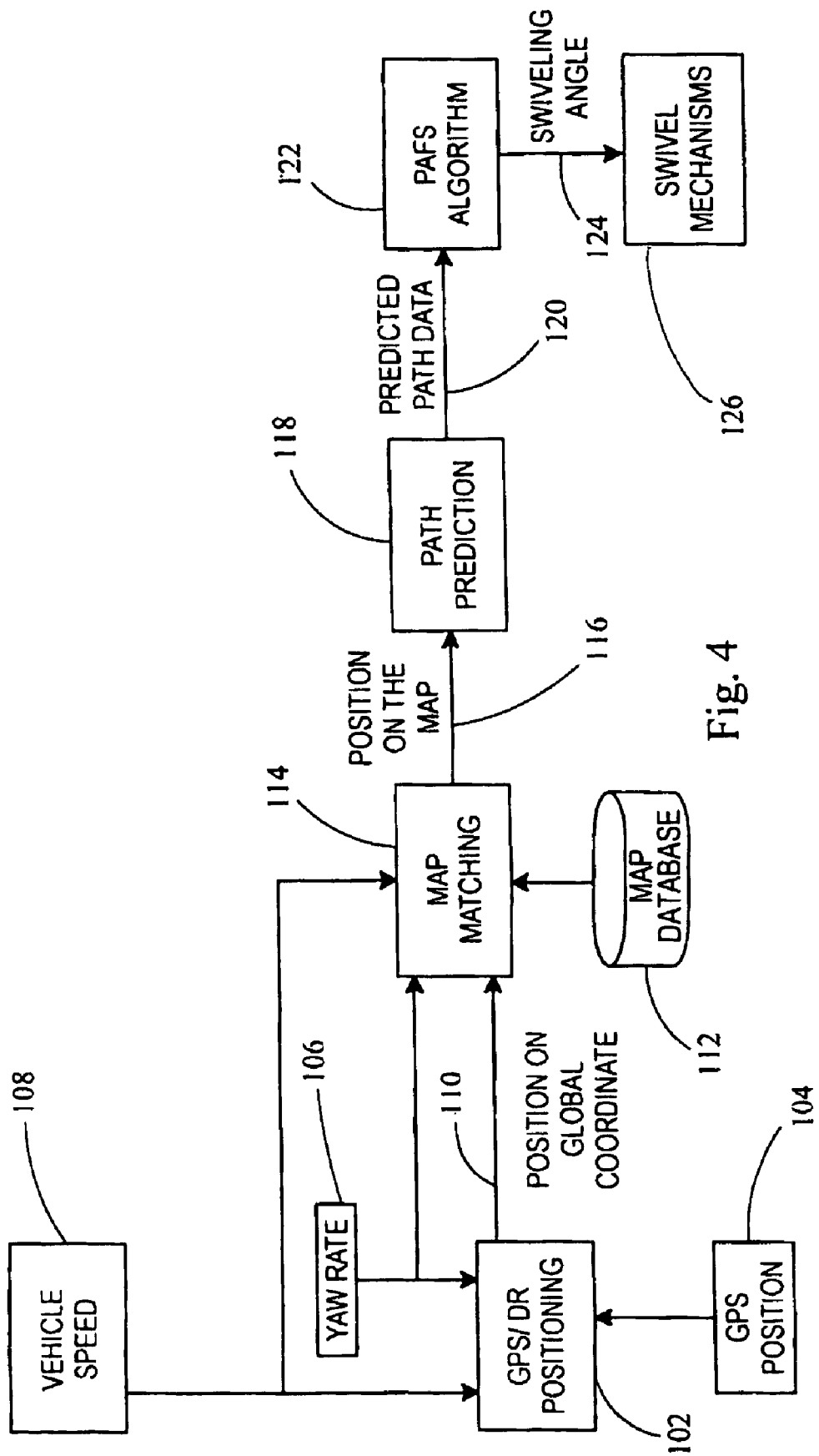
FIG. 4 is a block diagram of a method for determining a desired swivel angle.

FIG. 4 shows a block diagram of the algorithm used by the controller 12 in controlling the swivel mechanisms 18, 20 in accordance with the present invention. In block 102, the GPS position from block 104 is augmented with the yaw rate measurement from block 106 and speed measurement from block 108. The GPS position, yaw rate, and/or vehicle speed are used to calculate the vehicle position 110 in a global coordinate system. Using the map database 112, the map-matching algorithm 114 identifies the calculated vehicle position 116 on a map. The path prediction algorithm 118 analyzes the map relative to calculated position and the direction of vehicle travel. The path prediction algorithm 118 calculates the candidate list of the probable intended driving paths. From the list, the path prediction algorithm 118 determines the most probable path by associating confidence scores to each driving path on the list. Once the most likely path (MLP) is determined, the path prediction algorithm calculates the curvature of the MLP. The path data 120, including the resultant curvature values, are provided to the PAFS algorithm block 122. The PAFS algorithm 122 uses the calculated path data 120 in order to determine the desired swiveling angle 124 of each headlamp 14, 16. The desired swivel angles 124 are respectively provided to the swivel mechanisms 18, 20, as denoted by block 126.

Figure 5:
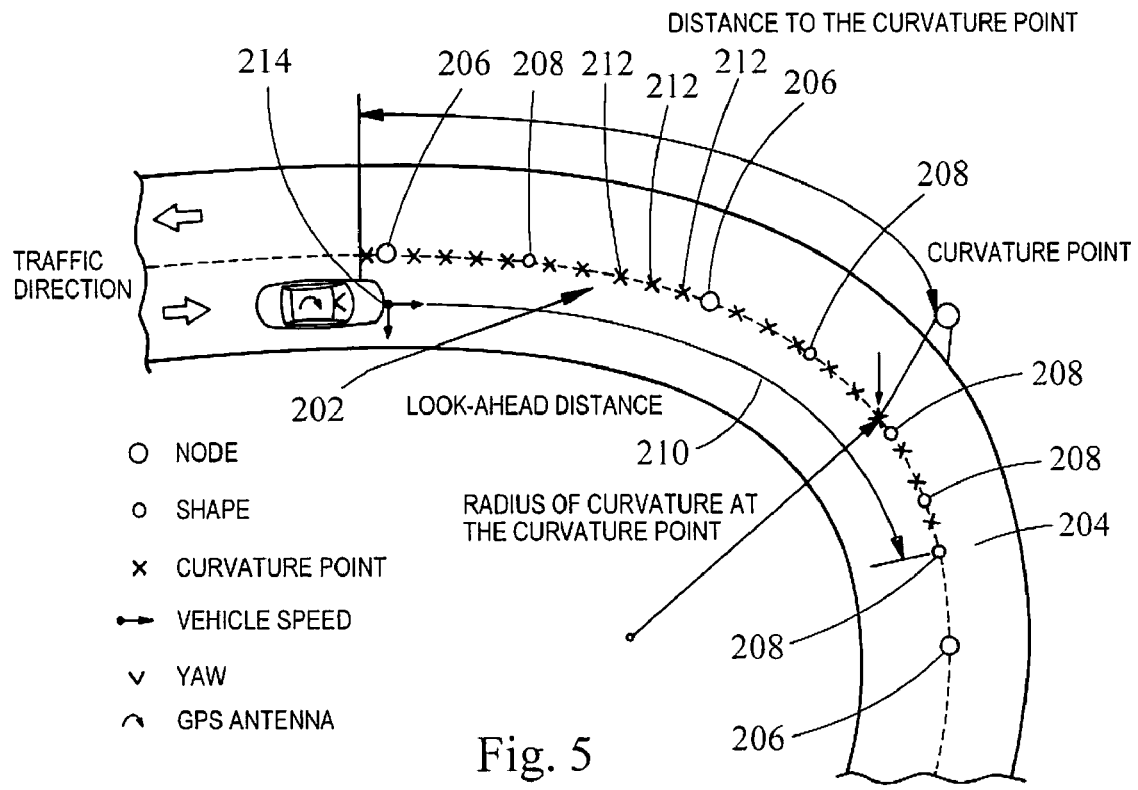
FIG. 5 is a graphical representation of vehicle path map data.

FIG. 5 shows a geometric representation 202 of the predicted path data 204. The geometric representation 202 in the map database 112 is performed using node points 206 and shape points 208. Every road segment in the map starts and ends with a node point 206. Shape points 208 are located between node points 206 to capture the road segment geometry. The path prediction algorithm 118 determines the most likely driving path and calculates the curvature at each of the shape points 208 and node points 206 within the range of the look ahead distance 210. The path prediction algorithm 118 also calculates the curvatures between shape points 208 based on a road model. In illustrative example, twenty curvature points 212 span over the look ahead distance 210 and the associated distances of each curvature point 212 measured from the vehicle position 214 are provided to the PAFS algorithm 122. The PAFS algorithm 122 uses some of these twenty curvature points 212 and distance values to determine the optimal headlamp swiveling angle 124. It will be readily appreciated that a greater or lesser number of curvature points 212 could be used.

As stated above, the path prediction module 118 provides, for example, twenty curvature points 212 along the look ahead distance 210. In addition, the path prediction module 118 also provides other data such as the corresponding geometric distance, travel distance, coordinate position and vehicle heading angle, which for example, is measured from north.

In an optimal design, the headlamp beam 74 itself can be deformed to follow the road geometry. In many implementations, however, the degree of freedom for shaping the beam is not sufficient to achieve such deformation. Some solutions may therefore be sub-optimal. One approach is based on placing the beam's kink point 78, shown in FIG. 2, at a desired lateral distance from the center of the host vehicle lane. However, this approach is subject to the constraint that glare is minimized and visibility is uniformly distributed on the host vehicle lane.

Accordingly, the minimal steps in operating a single path PAFS are:

1—Calculate the nominal swiveling angle ($\phi$) that will place the kink point at a lateral distance D from the host vehicle lane center.
2—Calculate the maximum swiveling angle ($\phi_L$) that can be used without creating glare to the oncoming traffic or badly affecting the visibility distribution.
3—Calculate the desired swivel angle ($\phi_f$) as the minimum of $\phi$ and $\phi_L$ in the absolute sense or a weighted average of $\phi$ and $\phi_L$. The weights given $\phi$ and $\phi_L$ may be a function of the difference between the two angles.

Figure 6:
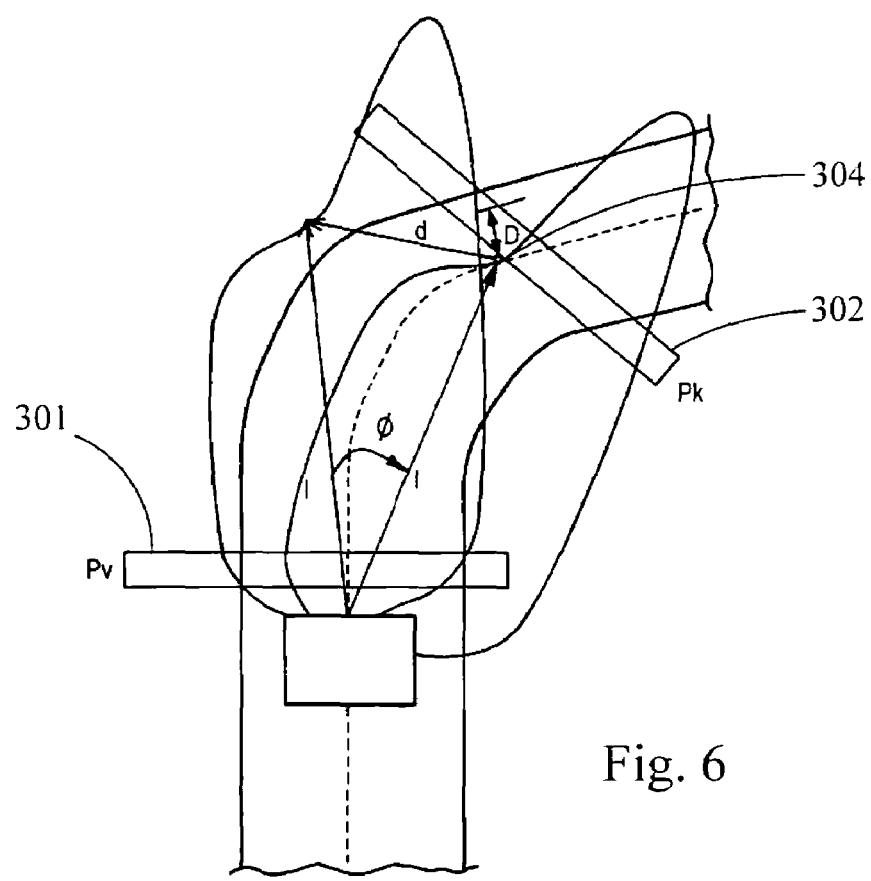
FIG. 6 is an overhead view illustrating the calculation of the desired swivel angle.
Figure 7A:
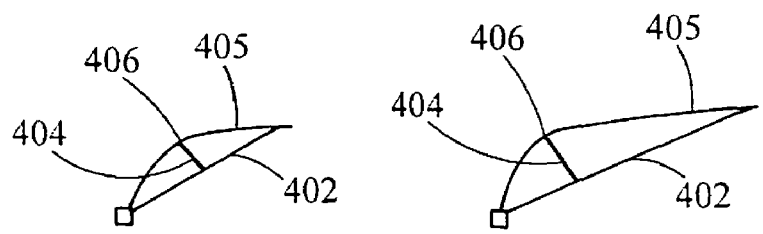
FIG. 7A-D are examples illustrating the maximum deviation point for various curved scenarios.
Figure 7B:
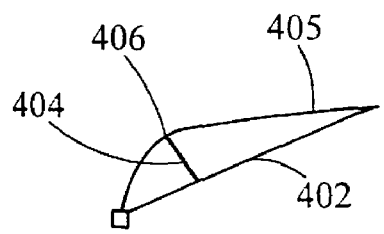
Figure 7C:
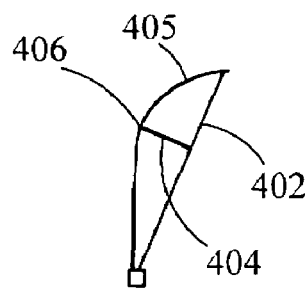
Figure 7D:
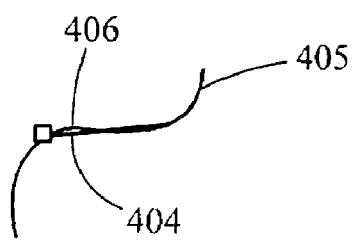

The calculation of the swiveling angle $\phi$ will be based on the curvature and distance data. As shown in FIG. 6, the headlamp beam 74 spans over a non-constant radius of curvature road segment. Even though the path prediction algorithm thoroughly describes the curvature behavior between area 301 and 302, for simplicity of this example, we will assume that the curvature ($\rho$) is linearly changing between area 301 and area 302. The area 301 is contained between curvature points $cp_1$, $cp_2$ and $cp_3$. Since the separation between curvature points is a function of speed, this separation of points will help in overcoming the delay. Therefore, $$\rho_v = \frac{\rho_1 + \rho_2 + \rho_3}{3} \quad (1)$$

where $\rho_v$ is the curvature at the vehicle position,
$\rho_1$ is the curvature at $cp_1$,
$\rho_2$ is the curvature at $cp_2$; and
$\rho_3$ is the curvature at $cp_3$.

The area 302 is contained between curvature point $cp_l$ ($p_l$) at geometric distance of l (distance to the kink point 304) and the next two cp's ($p_{next1}$, $p_{next2}$). Since the separation between the cp's is a function of speed, this will help in overcoming the delay. Therefore, $$\rho_k = \frac{\rho_l + \rho_{next1} + \rho_{next2}}{3} \quad (2)$$

where $\rho_k$ is the curvature at the kink point,
$\rho_l$ is the curvature at the distance,
$\rho_{next1}$ is the curvature at the first curvature point beyond $cp_l$ ($cp_{next1}$); and
$\rho_{next2}$ is the curvature at the second curvature point beyond $cp_l$ ($cp_{next2}$).

The curvature change rate K between area 301 and area 302 is calculated as $$\kappa = \frac{\rho_k - \rho_v}{l} \quad (3)$$

where l is the geometric distance between $cp_1$ and $cp_l$.

If the kink point 304 is to be placed at a lateral distance D (positive to the left) from the center of the road, the angle $\phi$ can be approximately related the heading angle ($\psi$) of the vehicle with respect to the road, the geometric distance l, the curvature $\rho_k$ and $\rho_v$ as follows:

$$\phi = -\psi + \frac{\rho_v}{3}l + \frac{\rho_k}{6}l - \frac{D}{l} \quad (4)$$

where, $\phi$ is the nominal swivel angle;
$\psi$ is a heading angle;
$\rho_v$ is the curvature at the vehicle position;
$\rho_k$ is the curvature at the kink point;
l is the distance to the kink point from the vehicle; and
D is a predefined lateral distance from the center of the host lane.

In the illustrative example, $\psi$ is positive to the right.

The calculation of the heading angle $\psi$ enables the PAFS algorithm 122 to compensate for driving behavior, for example when performing a lane change. Using a conventional AFS, the swiveling direction of headlamps' beam would follow the steering angle, and as a result the upcoming traffic would be glared and the visibility of the road ahead would be reduced.

The calculation of the heading angle can be achieved by using the following equation.

$$\psi = \psi_{gps} - \psi_{cp1\_2} \quad (5)$$

Where $\psi_{gps}$ is the GPS position heading angle measured from the north axis, and $\psi_{cp1-2}$ is the heading angle measured from the north axis of the vector that passes through cp1 and $cp_2$.

D represents a protection zone against the imperfect accuracy of the curvature values. For example, in the left curve scenario, it is desired to set the lateral distance D such that the kink point 304 will be placed to the outside part of the curve (to the right of the lane center). This will minimize the glaring effect due to any errors in the curvature values.

To improve uniformity in visibility and avoid glare, the maximum swivel angle ($\phi_L$) is calculated. Introducing the term $\rho_v$ will help to make the visibility almost uniform along the driving path and will decrease the glare to oncoming traffic. However, to guarantee that the visibility uniformity will not be negatively affected and that glare will be controllable, the following approach may be utilized.

The controller 12 determines the curvature point between area 301 and area 302 where the vertical line that equally divides the beam (beam center line 402) has its maximum lateral deviation 404 from the center of the road 405, see FIGS. 7A-D.

As can be noticed from FIGS. 7A-D, the point of maximum deviation 406 is always closer to the maximum of the curvatures at area 301 and area 302 if both curvatures have the same sign. Therefore, the point of maximum deviation 406 can be approximated to be at a distance L where $$L = \frac{l}{2}\left(1 + \frac{|\rho_k| - |\rho_v|}{|\rho_k - \rho_v| + \max(|\rho_v| \cdot |\rho_k|)}\right) \quad (6)$$

The idea behind this formula is that when $\rho_v$ is greater than $\rho_k$ and both have the same sign, the point of maximum deviation will be less than 1/2, which aligns with the concept illustrated in FIGS. 7A-D. On the other hand, if $\rho_k$ is greater than $\rho_v$ and they have the same sign, the point of maximum deviation will be greater than 1/2. If the sign of the two curvatures differ, then the controller 12 sets $\rho_k=0$, i.e.

$$L = \frac{l}{4} \quad (7)$$

Let us assume that a lateral deviation of $D_L$ (for example, (1/5)th the lane width) is acceptable, then the angle threshold can be calculated $$\phi_L = -\psi + \frac{\rho_v}{3}L + \frac{\rho_L}{6}L - \frac{D_L}{L} \quad (8)$$

$\rho_L$ is the curvature at the distance L. The final desired swiveling angle ($\phi_f$) can be the minimum of $\phi$ and $\phi_L$.

$$|\phi_f|=\min(|\phi_L|,|\phi|) \quad (9)$$

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

We claim:

1. A system for predictive adaptive front lighting of a vehicle, the system comprising:
   a first headlamp and a second headlamp configured to cooperatively project a beam pattern;
   a first swivel mechanism coupled to the first headlamp to change a swivel angle of the first headlamp;
   a second swivel mechanism coupled to the second headlamp to change a swivel angle of the second headlamp;
   a controller configured to identify a map location of the vehicle, to determine a most likely path of the vehicle based on the map location, and to calculate a desired swivel angle of the first and second headlamps based on the most likely path of the vehicle; and
   wherein the controller is configured to determine a kink point position relative to the most likely path of the vehicle, wherein the kink point is an inflection point in the beam pattern formed by the first and second headlamp.

2. The system according to claim 1, wherein the controller is configured to calculate a nominal swivel angle such that the kink point is a predefined distance from a center of a host vehicle lane.

3. The system according to claim 2, wherein the controller is configured to calculate a maximum swivel angle so as to minimize glare for on coming traffic.

4. The system according to claim 3, wherein the controller is configured to determine a desired swivel angle based on the maximum swivel angle and the nominal swivel angle.

5. A system for predictive adaptive front lighting of a vehicle, the system comprising:
   a first headlamp and a second headlamp configured to cooperatively project a beam pattern;
   a first swivel mechanism coupled to the first headlamp to change a swivel angle of the first headlamp;
   a second swivel mechanism coupled to the second headlamp to change a swivel angle of the second headlamp;
   a controller configured to identify a map location of the vehicle, to determine a most likely path of the vehicle based on the map location, and to calculate a desired swivel angle of the first and second headlamps based on the most likely path of the vehicle; and
   wherein the controller is configured to determine a kink point position relative to the most likely path of the vehicle; and
   calculate a nominal swivel angle such that the kink point is a predefined distance from a center of a host vehicle lane, the nominal swivel angle is calculated according to the relationship:

$$\phi = -\psi + \frac{\rho_v}{3}l + \frac{\rho_k}{6}l - \frac{D}{l}$$

where, $\phi$ is the nominal swivel angle;
$\psi$ is a heading angle;
$\rho_v$ is the curvature at the vehicle position;
$\rho_k$ is the curvature at the kink point;
l is the distance to the kink point from the vehicle; and
l is the distance to the kink point from the vehicle; and
D is a predefined lateral distance from the center of the host vehicle lane.

6. The system according to claim 5, wherein the controller is configured in a curve entry scenario to start to swivel the first and second headlamps ahead of the curve.

7. The system according to claim 6, wherein the controller is configured in a curve exiting scenario to swivel the first and second headlamps back to a straight position before the vehicle ends the curve.

8. The system according to claim 6, wherein the controller is configured in an S-curve scenario to start to swivel the headlamps before the saddle point in the direction of an upcoming curve to avoid glare for oncoming traffic and improve the visibility of the upcoming curve ahead.

9. The system according to claim 6, wherein the desired swivel angle is calculated based on a curvature of the most likely path of the vehicle.

10. A system for predictive adaptive front lighting of a vehicle, the system comprising:
   a first headlamp and a second headlamp configured to cooperatively project a beam pattern;
   a first swivel mechanism coupled to the first headlamp to change a swivel angle of the first headlamp;
   a second swivel mechanism coupled to the second headlamp to change a swivel angle of the second headlamp;
   a controller configured to identify a map location of the vehicle, to determine a most likely path of the vehicle based on the map location, and to calculate a desired swivel angle of the first and second headlamps based on the most likely path of the vehicle; and
   wherein the controller is configured to determine a kink point position relative to the most likely path of the vehicle;
   calculate a nominal swivel angle such that the kink point is a predefined distance from a center of a host vehicle lane; and
   wherein the controller is configured to calculate the maximum swivel angle based on the relationship so as to minimize glare for on coming traffic:

$$\phi_L = -\psi + \frac{\rho_v}{3}L + \frac{\rho_L}{6}L - \frac{D_L}{L}$$

where, $\phi_L$ is the maximum swivel angle;
$\psi$ is a heading angle;
$\rho_v$ is the curvature at the vehicle position;
$\rho_L$ is the curvature at the distance L;
L is the distance to the point of maximum deviation from the vehicle; and
$D_L$ is the lateral deviation at the kink point from the center of the host vehicle center lane.

11. A system for predictive adaptive front lighting of a vehicle, the system comprising:
   a first headlamp and a second headlamp configured to cooperatively project a beam pattern;
   a first swivel mechanism coupled to the first headlamp to change a swivel angle of the first headlamp;
   a second swivel mechanism coupled to the second headlamp to change a swivel angle of the second headlamp;
   a controller configured to identify a map location of the vehicle, to determine a most likely path of the vehicle based on the map location, and to calculate a desired swivel angle of the first and second headlamps based on the most likely path of the vehicle; and
   wherein the controller is configured to determine a kink point position relative to the most likely path of the vehicle;
   calculate a nominal swivel angle such that the kink point is a predefined distance from a center of a host vehicle lane; and
   wherein the controller is configured to calculate a maximum swivel angle so as to minimize glare for on coming traffic based the relationship:

$|\phi_f| = \min(|\phi_L|, |\phi|);$ where, $\phi_f$ is the desired swivel angle;
$\phi$ is the nominal swivel angle; and
$\phi_L$ is the maximum swivel angle.

12. A method for predictive adaptive front lighting of a vehicle, the method comprising:
   receiving a vehicle position;
   identifying a map location of the vehicle;
   determining a most likely path of the vehicle based on the map location;
   calculating a desired swivel angle for vehicle headlamps based on the most likely path;
   wherein the desired swivel angle is calculated such that a kink point position is determined relative to the most likely path of the vehicle; and
   calculating a nominal swivel angle such that the kink point is a predefined distance from a center of a host vehicle lane, according to the relationship:

$$\phi = -\psi + \frac{\rho_v}{3}l + \frac{\rho_k}{6}l - \frac{D}{l}$$

where, $\phi$ is the nominal swivel angle;
$\psi$ is the heading angle;
$\rho_v$ is the curvature at the vehicle position;
$\rho_k$ is the curvature at the kink point;
l is the distance to the kink point from the vehicle; and
D is a predefined lateral distance from the center of the host vehicle center lane.

13. The method according to claim 12, further comprising calculating a maximum swivel angle that does not create glare for on coming traffic.

14. The method according to claim 13, wherein the maximum swivel angle is calculated based on the relationship:

$$\phi_L = -\psi + \frac{\rho_v}{3}L + \frac{\rho_L}{6}L - \frac{D_L}{L}$$

where, $\phi_L$ is the maximum swivel angle;
$\psi$ is the heading angle;
$\rho_v$ is the curvature at the vehicle position;
$\rho_L$ is the curvature at the distance L;
L is the distance to the point of maximum deviation from the vehicle; and
$D_L$ is a predefined lateral distance from the center of the host vehicle center lane.

15. The method according to claim 13, further comprising determining a desired swivel angle based on the maximum swivel angle and the nominal swivel angle.

16. The method according to claim 15, wherein the desired swivel angle is calculated based the relationship.

$|\phi_f| = \min(|\phi_L|, |\phi|);$ where, $\phi_f$ is the desired swivel angle;
$\phi$ is the nominal swivel angle; and
$\phi_L$ is the maximum swivel angle.

17. The method according to claim 12, wherein the desired swivel angle is calculated based on a curvature of the likely path.

* * * * *